(12) United States Patent
Leung et al.

(10) Patent No.: US 11,151,066 B2
(45) Date of Patent: *Oct. 19, 2021

(54) LINK WIDTH SCALING ACROSS MULTIPLE RETIMER DEVICES

(71) Applicant: TEXAS INSTRUMENTS INCORPORATED, Dallas, TX (US)

(72) Inventors: Pakyiu Leung, Hayward, CA (US); Casey Thomas Morrison, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,174

(22) Filed: Apr. 23, 2020

(65) Prior Publication Data

US 2020/0250114 A1 Aug. 6, 2020

Related U.S. Application Data

(63) Continuation of application No. 15/858,366, filed on Dec. 29, 2017, now Pat. No. 10,671,553.

(51) Int. Cl.
*G06F 13/40* (2006.01)
*G06F 13/16* (2006.01)
*G06F 13/12* (2006.01)
*G06F 13/42* (2006.01)
*G06F 13/364* (2006.01)
*G06F 1/10* (2006.01)

(52) U.S. Cl.
CPC ............ *G06F 13/1678* (2013.01); *G06F 1/10* (2013.01); *G06F 13/124* (2013.01); *G06F 13/364* (2013.01); *G06F 13/4282* (2013.01); *G06F 13/4295* (2013.01); *G06F 2213/0026* (2013.01)

(58) Field of Classification Search
CPC .................................................. G06F 13/1678
See application file for complete search history.

(56) References Cited

U.S. PATENT DOCUMENTS

| | | | | |
|---|---|---|---|---|
| 7,012,956 B1 * | 3/2006 | Thomsen | ............... | G11C 29/02 375/224 |
| 2003/0215041 A1 * | 11/2003 | Gauthier | ............... | H03L 7/0812 375/376 |
| 2011/0205433 A1 * | 8/2011 | Altmann | ............ | H04N 21/4622 348/513 |

* cited by examiner

*Primary Examiner* — Henry Tsai
*Assistant Examiner* — Dean Phan
(74) *Attorney, Agent, or Firm* — John R. Pessetto; Charles A. Brill; Frank D. Cimino

(57) ABSTRACT

Differing widths of retimers are developed using differing numbers of individual retimer elements combined together. To maintain synchronous operation, various signals are provided between the individual retimer elements to allow synchronization of the various operations. A first signal is a wired-OR signal that is used for event and operation synchronization. A second set of signals form a serial bus used to transfer proper state information and operation correction data from a master retimer element to slave timer elements. The combination of the wired-OR signal and the serial bus allow the various state machines and operations inside each retimer element to be synchronized, so that the entire width of the link is properly synchronized.

14 Claims, 13 Drawing Sheets

LINK WIDTH SCALING ACROSS MULTIPLE RETIMER DEVICES

CROSS-REFERENCE TO RELATED APPLICATION(S)

This continuation application claims priority to U.S. patent application Ser. No. 15/858,366, filed Dec. 29, 2017, which application is incorporated herein by reference in its entirety.

BACKGROUND

1. Field

The field relates to high-speed communication devices.

2. Description of the Related Art

Peripheral component interconnect Express (PCIe) links are used to interconnect many different devices and computer systems today. One property of PCIe links is that they can be of different widths, such as one lane, two lanes, four lanes, eight lanes or 16 lanes. By using additional lanes, the overall data throughput of the communication is increased proportionally. One drawback of using PCIe links is that the PCIe links have a relatively limited length because of their high speeds and the various properties of materials over which they are transmitted. To reach longer distances, retimers have been developed to allow the signals on the various lanes of the PCIe links to be re-timed or re-synchronized and then re-driven. This allows an effective increase in the length of allowable PCIe links.

Because of the various number of lanes that can be supported by PCIe links, it has been customary to use specific devices for a given width. For example, a 16 lane PCIe link utilizes a 16 lane retimer device, while a four lane PCIe link uses a four lane retimer device. This requires the use of different parts for each number of lanes used by the PCIe link, which results in inventory problems and the like. Further, for very wide retimer devices, such as the 16 lanes, the heat developed by the particular retimer device becomes very large, requiring heat sinking and other dissipation efforts. Further, the large space required by the wider retimer devices is problematic in space constrained applications. In addition, because of the need to route so many high-speed signals, such as 64 signals for a 16 lane retimer (differential transmit and receive signals for each of the 16 lanes), to and from retimer device, the printed circuit board becomes more complicated.

SUMMARY

Differing widths of retimers are developed using differing numbers of individual retimer elements combined together. To maintain synchronous operation, various signals are provided between the individual retimer elements to allow synchronization of the various operations in the retimer elements. A first signal is a wired-OR signal that is used for event and operation synchronization. A second set of signals form a serial bus used to transfer proper state information and operation correction data from a master retimer element to the slave timer elements. The combination of the wired-OR signal and the serial bus allow the various state machines and operations inside each retimer element to be synchronized, so that the entire width of the link is properly synchronized as if it were done by a monolithic retimer device. By utilizing retimer elements fewer parts are needed to be inventoried. In addition, each individual retimer element has a lower power draw and is more easily distributed across a circuit board to simplify both heat dissipation and signal routing issues.

BRIEF DESCRIPTION OF THE FIGURES

For a detailed description of various examples, reference will now be made to the accompanying drawings in which.

DETAILED DESCRIPTION

Figure 1:
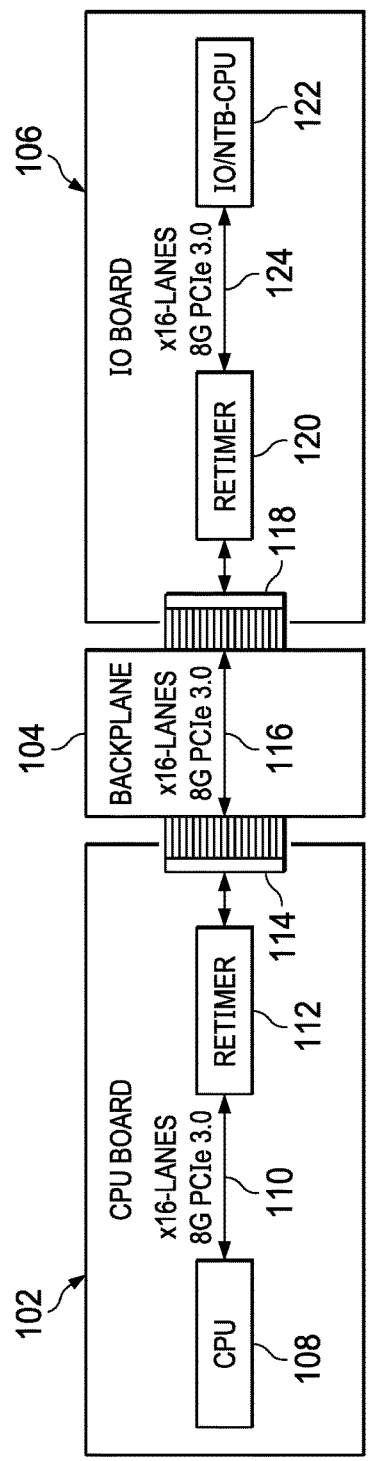
FIG. 1 is a block diagram of an example use of retimers in a computer system.

Referring now to FIG. 1, an example use of retimers is shown. A CPU board 102 is connected by a backplane 104 with an I/O board 106. A CPU 108 on the CPU board 102 uses 16 lanes of PCIe as a 16 lane PCIe link 110 connected to a retimer device 112. The retimer device 112 connects to a connector 114 on the backplane 104. The 16 lanes of a PCIe link 116 traverse the connector 114 from the retimer device 112 and the backplane 104 to a connector 118 connected to the I/O board 106. The 16 lanes of the PCIe link 116 are connected to a retimer 120. The retimer 120 is connected to an I/O CPU 122 by a 16 lane PCIe link 124. Because of the distance between the CPU 108 and the I/O CPU 122 and the need to traverse two connectors 114 and 118, a PCIe link directly from the CPU 108 to the I/O CPU 122 would not be feasible. By utilizing retimer devices 112 and 120 the distances of each individual PCIe link are reduced and the retimers resolve any reflection issues and other signal issues created by the connectors 114 and 118. This allows the use of high-speed PCIe links in a much broader environment, where various components are distributed beyond the links normally traversed by a PCIe link.

Figure 2:
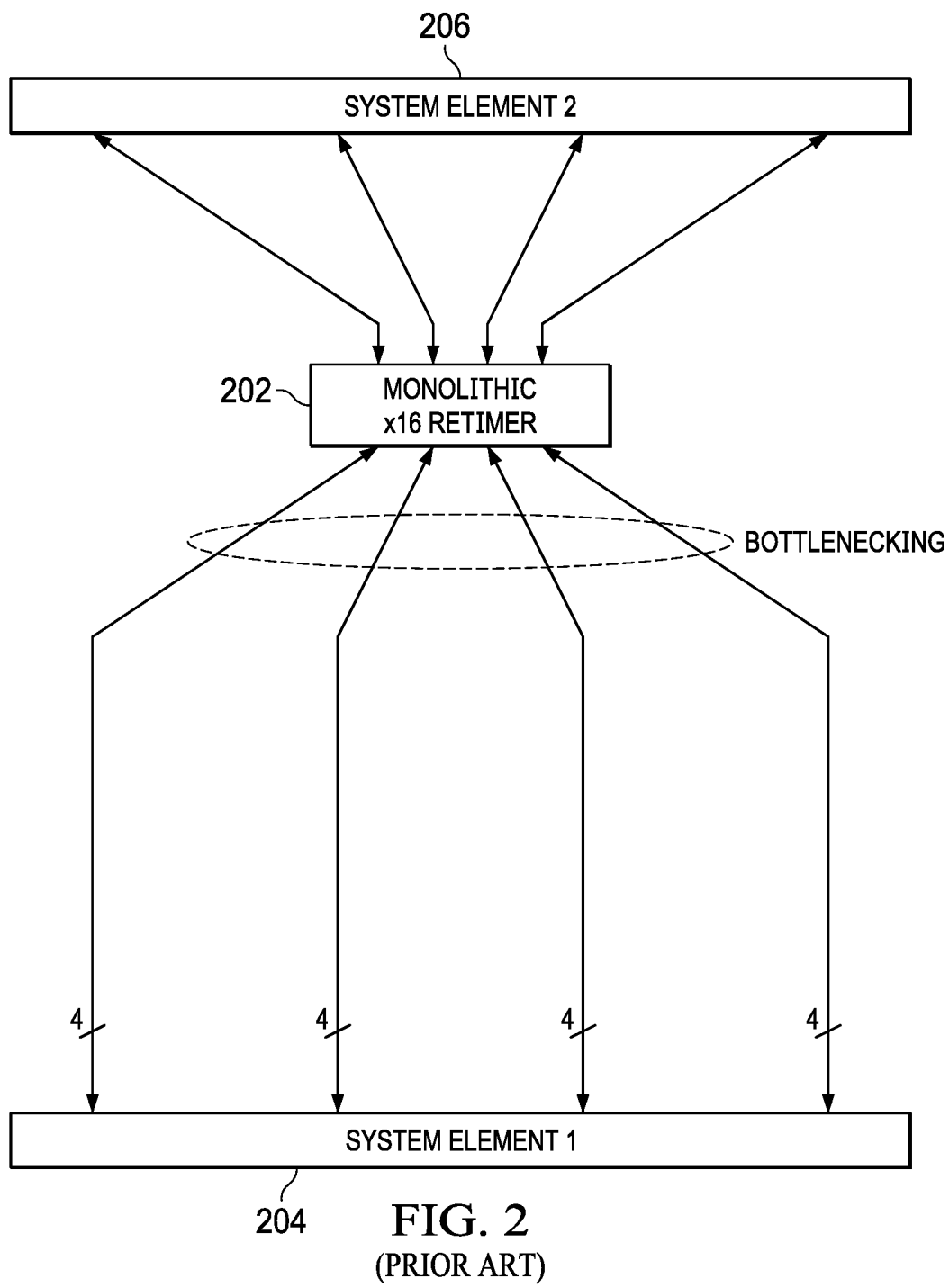
FIG. 2 is a block diagram of a monolithic retimer.

As noted above, it is customary to use a monolithic retimer. Referring now to FIG. 2, a monolithic retimer 202 that is 16 lanes wide is illustrated. The monolithic retimer 202 is connecting a system element 1 204 and a system element 2 206. As can be seen in FIG. 2, the traces on the printed circuit board from system element 1 204 and system element 2 206 must be condensed and narrowed to work with the monolithic retimer 202.

Figure 3:
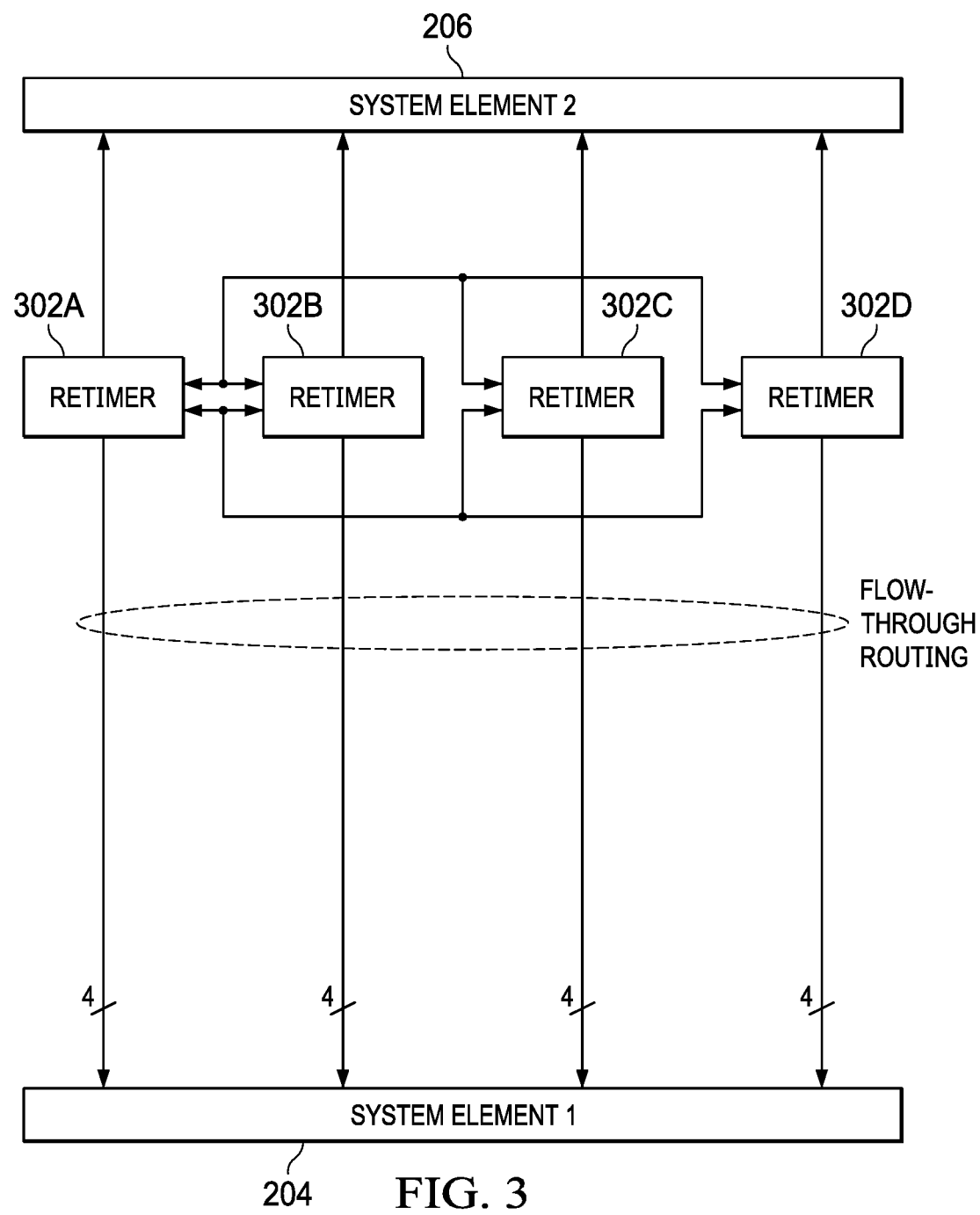
FIG. 3 is a block diagram of an example of using narrower width retimer elements to develop a wider retimer.

FIG. 3 illustrates the use of narrower retimer elements that can be stacked or linked together to provide a wider PCIe link, Retimer elements 302A-302D each handle four lanes between system element 1 204 and system element 2 206. The retimer elements 302A-302D are interconnected and operate as described below. As smaller retimer elements are used, wiring is simplified and heat dissipation is also spread out and simplified.

Figure 4:
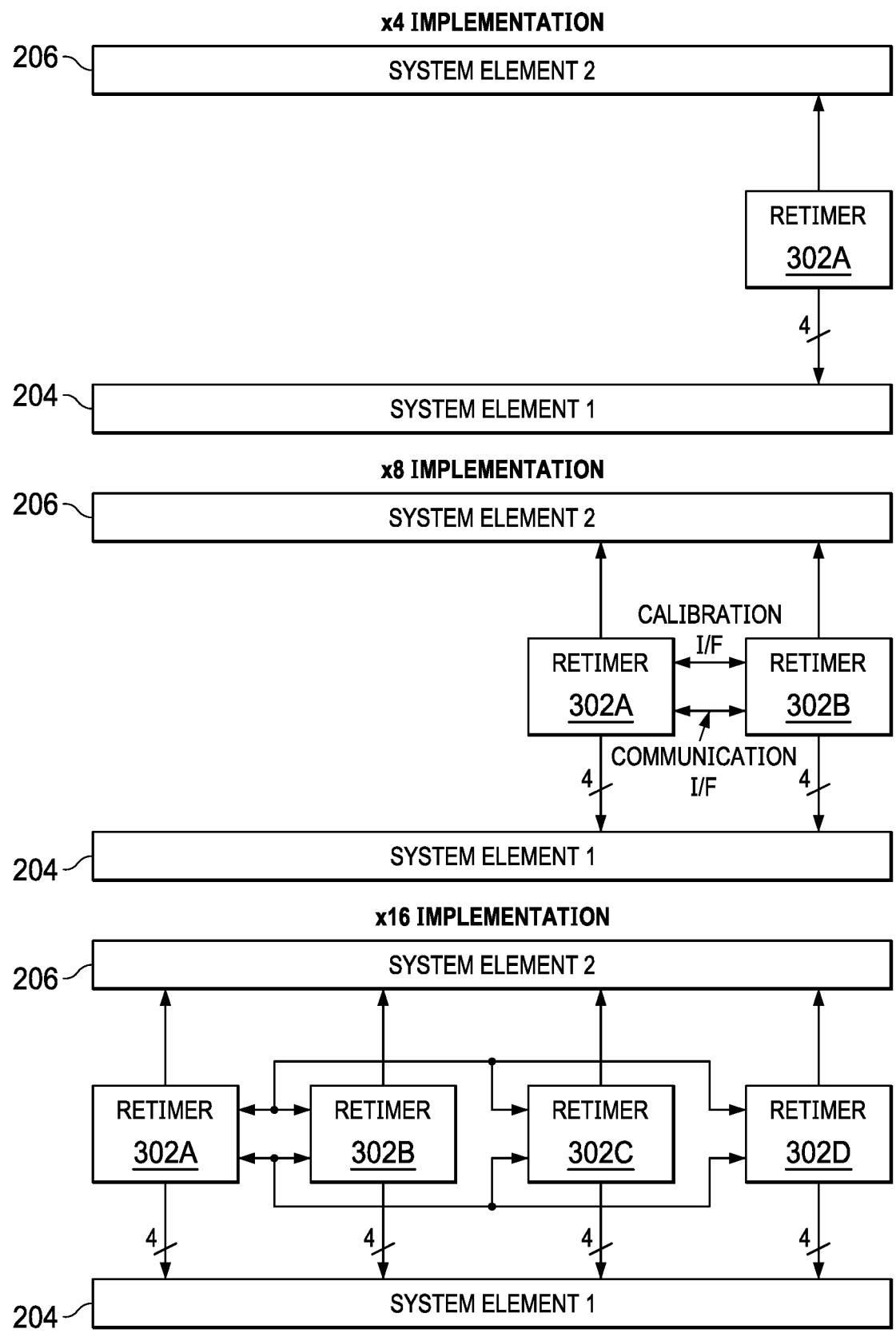
FIG. 4 are block diagrams illustrating development of various width retimers using narrower retimer elements.

FIG. 4 illustrates the use of different numbers of retimer elements to form different width PCIe links. A single retimer element 302A forms a four lane PCIe link between the system element 1 204 and the system element 2 206. Two retimer elements 302A, 302B are used to form an eight lane PCIe link, while four retimer elements 302A-302D are used together to form a 16 lane link. Therefore, varying widths of a PCIe link are developed using only a single component, thereby reducing inventory issues.

Figure 5:
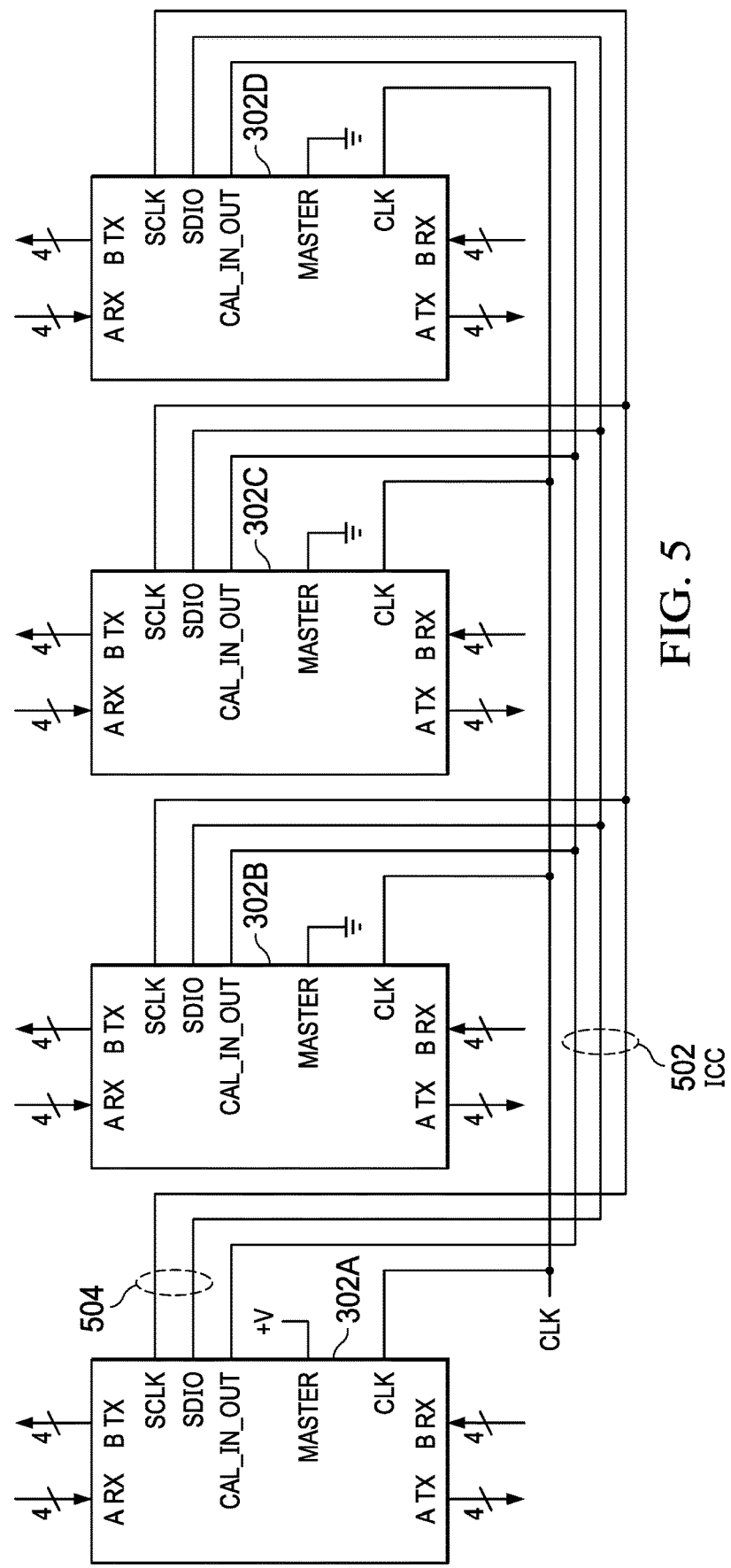
FIG. 5 is a more detailed block diagram of the multiple retimer elements of FIG. 3.

Referring now to FIG. 5, more details of the retimer elements 302A-302D are provided. As PCIe links are bidirectional, each particular retimer element 302A-302D needs to include provisions for transmit and receive signals in each direction. Using retimer element 302A as an example, the retimer element 302A includes four inputs for a side A receiver and four outputs for a side A transmitter. Further, the retimer element 302A contains four inputs for a side B receiver and for outputs for a side B transmitter. A clock signal is provided to each of the retimer elements 302A-302D to provide a basic clocking signal for the retimer elements 302A-302D. Details on the internal clocking of the retimer elements 302A-302D is provided below.

Each retimer element 302A-302D includes a master pin. If the master pin is connected high, that particular retimer element is operating as a master element, while if the master pin is tied to ground, that particular retimer element is acting as a slave element. In FIG. 5, retimer element 302A is connected as a master element and retimer elements 302B-302D are connected as slave elements. As each retimer element 302A-302D includes various state machines and operations that must be kept in synchronization to operate as a proper 16 lane PCIe link, various signals are connected between the four retimer elements 302A-302D. The first signal, the CAL_IN_OUT or calibration input and output signal, which is a calibration signal which is used to indicate when each particular retimer element 302A-302D has completed a particular operation and to synchronize starting of the next state or operation. The CAL_IN_OUT pins are connected in a wired-OR manner so that each retimer element 302A-302D can indicate its timing information. Each retimer element 302A-302D includes an SCLK or serial bus clock pin and SDIO or serial data input output pin. The SCLK and SDIO pins of each of the retimer elements 302A-302D are connected together, with the SDIO pins connected in a wired-OR manner so that the various retimer elements 302A-302D can indicate conditions and the like. This forms a serial bus 504 used by the master to provide more detailed state information to the slave retimer elements to maintain synchronous operation of the devices and to allow retimer elements to indicate error conditions and the like as described below. Together the CAL_IN_OUT wired-OR calibration line, SCLK serial bus clock and SDIO serial data line form an inter-chip communication (ICC) link 502.

Figure 6:
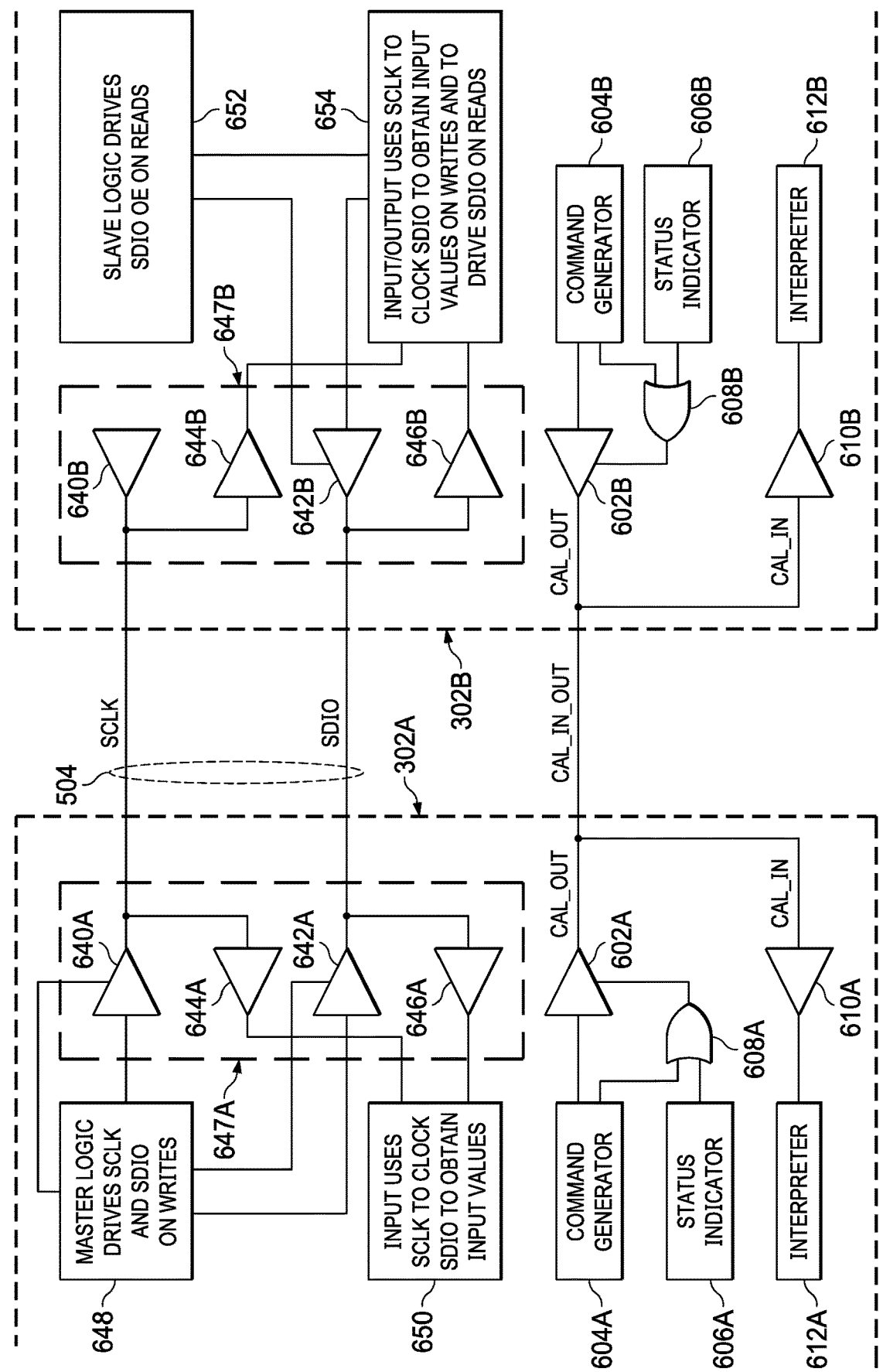
FIG. 6 is a detailed block diagram of communication signals and circuits between two retimer elements.

FIG. 6 illustrates the CAL_IN_OUT signals and the SCLK and SDIO signals in more detail, along with related circuitry. Two different retimer elements 302A and 302B are shown for simplicity. Each retimer element 302A, 302B includes a driver 602A, 602B used to drive the CAL_IN_OUT wired-OR calibration line, basically producing a CAL_OUT signal. The drivers 602A, 602B receive their inputs from the various command generators 604A, 604B, such as state machines, some of which are described in more detail below. As the retimer element 302B is operating in slave mode, the command generator 604B is disabled. To provide the desired timing information, a status indicator 606A, 606B signal is provided as one input to an OR gate 608A, 608B. The status indicator is representative of the operational state of the various state machines in the retimer element 302A, 302B. The second input to the OR gate 608A, 608B is provided by the command generator 604A, 6046, representative of outputs of the various state machines in the retimer element 302A, 302B. The output of the OR gate 608A, 608B controls the enable output of the driver 602A, 602B.

Referring to retimer element 302B, because the command generator 604B is disabled, a command value of zero is provided to the input of the driver 602B. In this manner when the status indicator 606B indicates that a particular operation is not yet complete, a high signal is provided to the OR gate 608B, which in turn enables the driver 602B to drive the zero value onto the CAL_IN_OUT line to indicate the retimer element has not completed operation. When the operation completes, the status indicator 606B goes to a low state, so that the driver 602B is disabled and the CAL_IN_OUT line is no longer driven by the driver 602B, so that the CAL_IN_OUT line will go to a high level if no other retimer elements are driving the CAL_IN_OUT line. Operation of the driver 602A is similar, except that because the command generator 604A is active, signals will be provided from the command generator 604A as well as the status indicator 606A.

A receiver 610A, 6106 is connected to the CAL_IN_OUT line to receive a CAL_IN signal. The output of the receiver 610A, 610B is provided to various interpreter circuitry 612A, 612B, representative of the inputs of the various state machines and the like described below.

Figure 7:
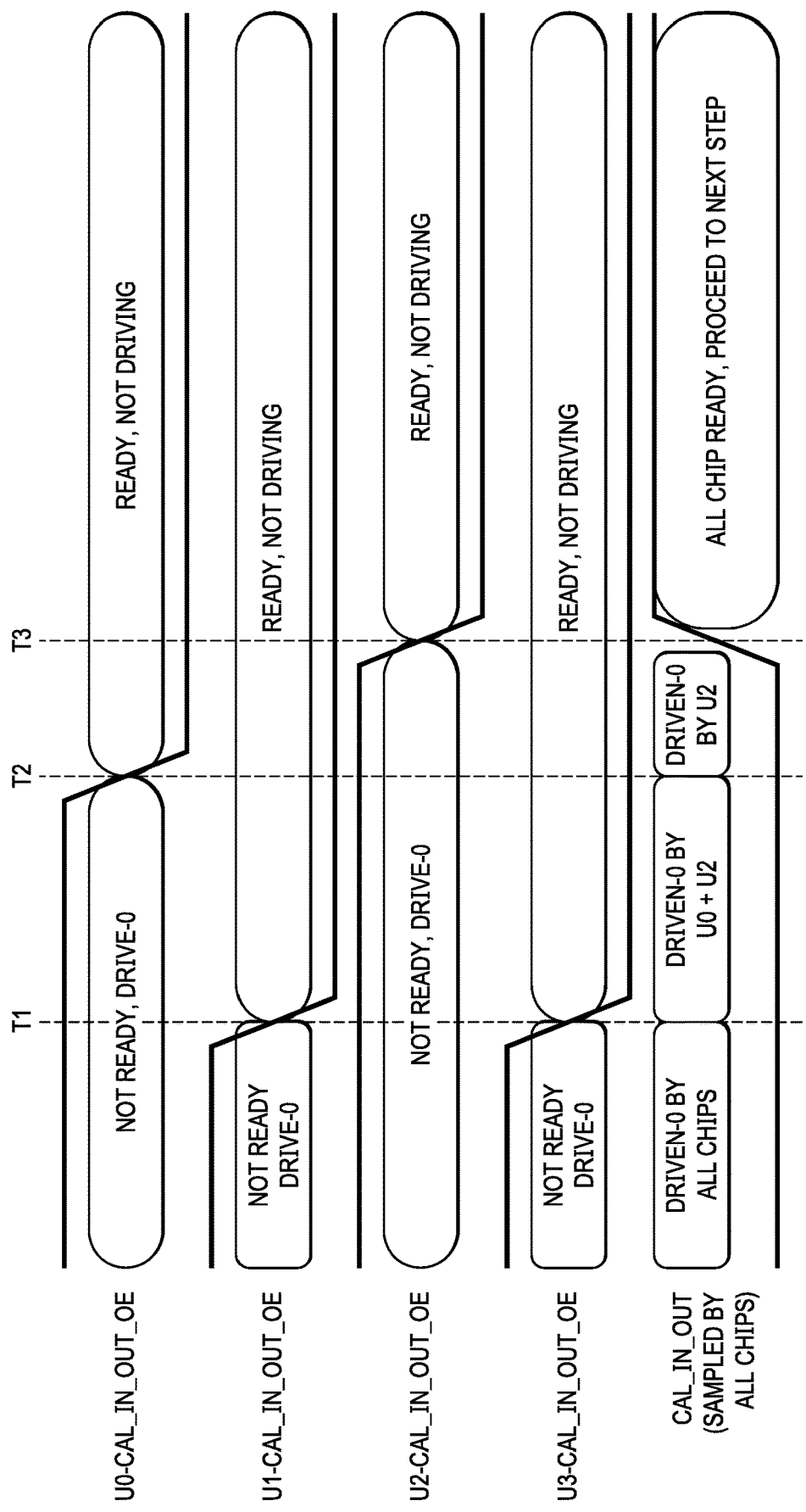
FIG. 7 is a timing diagram illustrating operation of CAL_IN_OUT communication signal of FIG. 6.

FIG. 7 illustrates the operation of the CAL_IN_OUT line. In the example timing diagram of FIG. 7, four retimer elements are connected together. Initially each of the timer elements is not ready, so the output enable signal to the drivers 602 are enabled and driving zeros to the CAL_IN_OUT line. This is indicated by each of the four retimer elements indicating not ready and driving zero onto the CAL_IN_OUT line. This is shown by the rectangle in the CAL_IN_OUT line shown at the bottom of FIG. 7 indicating driven to zero by all chips or retimer elements. This continues up to time T1. At time T1 the second and fourth retimer elements complete their operation in the desired state and are now ready. The second and fourth retimer elements then provide a low signal to the enable input of the driver 602, so that the driver 602 stops driving the CAL_IN_OUT line signal. This is indicated by the rectangle shown in the CAL_IN_OUT line that shows being driven to zero by only the first and third retimer elements. At time T2 the first retimer element is ready, so that the first retimer element has its output enable set to zero and stops driving the CAL_IN_OUT line. This results in only the third retimer element driving the CAL_IN_OUT line low. Finally, at time T3 the third retimer element has completed the operation and disables the output enable of the driver 602. This results in the CAL_IN_OUT line going to a high state as it is a wired-OR line and no retimer elements are driving. This rising edge is then used to indicate that all of the retimer elements are ready and then the retimer elements proceed to the next step in operation together based on the rising edge.

Figure 8:
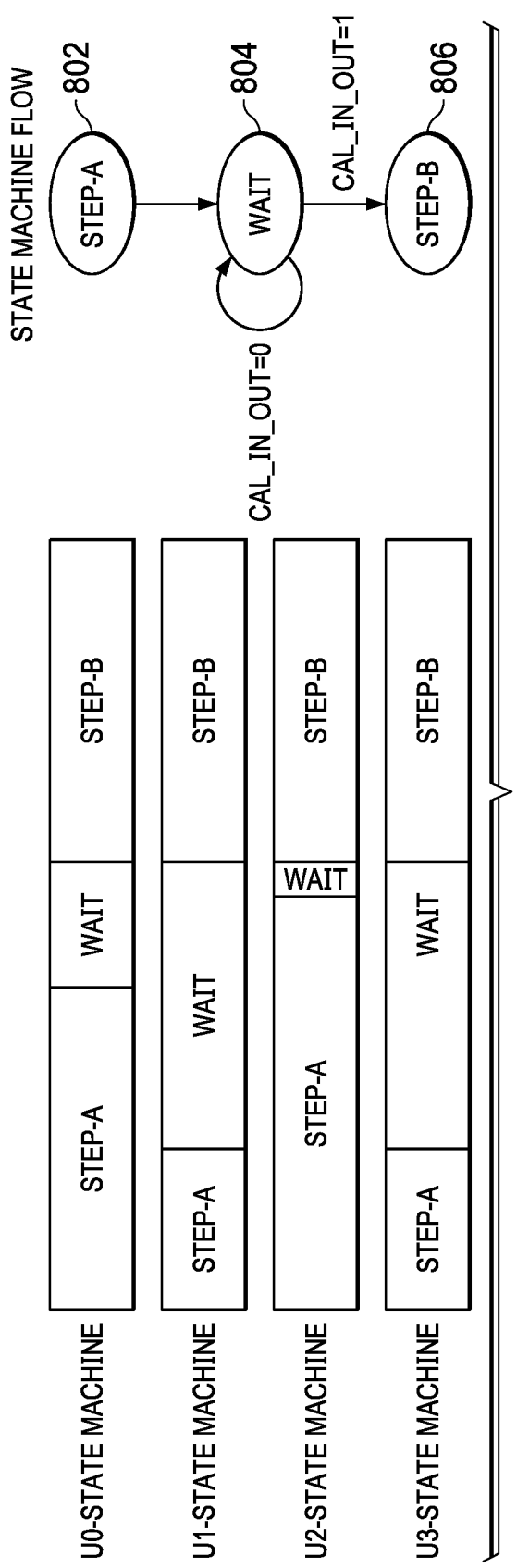
FIG. 8 is a timing diagram of CAL_IN_OUT communication signals of FIG. 6 in conjunction with a state machine utilizing the CAL_IN_OUT communication signal.

An alternate format is shown in FIG. 8. As indicated above, part of the use of the CAL_IN_OUT line is to synchronize state machines. In FIG. 8 four retimer elements are shown as being in step A 802 of a given state machine. During step A 802 each of the state machine is indicating to the retimer elements to enable the output driver 602 to drive the CAL_IN_OUT line to a low state to indicate the state operation is not completed. This causes the state machine to remain in a loop at a wait state 804. Over time each of the various state machines completes in the various retimer elements and stops driving the CAL_IN_OUT line, indicating completion of the state operation. In the illustration ultimately the third state machine completes step A 802 of the state machine and stops driving the CAL_IN_OUT line. This results in the indication of the rising edge of the CAL_IN_OUT line shown in FIG. 7 and in FIG. 8 the transition of the state machine from the wait state 804 to the step B state 806. As shown, all of the state machines in each retimer element then advance to the step B state 806 together in synchronization.

Returning now to FIG. 6, the serial bus interface is also shown in more detail. Retimer element 302A, 302B includes an SCLK driver 640A, 640B and an SDIO driver 642A, 642B. Each retimer element 302A, 302B includes an SCLK receiver 644A, 644B and an SDIO receiver 646A, 646B. The SCLK driver 640A, 640B, SDIO driver 642A, 642B, SCLK receiver 644A, 644B and SDIO receiver 646A, 646B form serial bus endpoints 647A, 647B. Retimer element 302A, as the master, includes a master logic block 648 that drives the SCLK signal through the SCLK driver 640A at all times and drives the SDIO signal through the SDIO driver 642A on write operations. The retimer element 302A includes an input block 650 which receives the SCLK signal from the SCLK receiver 644A and uses that clock and the SDIO signal received from the SDIO receiver 646A to collect data. In this manner, retimer element 302A synchronizes its own operation based on the inputs received on the SDIO signal.

The retimer element 302B, as a slave, includes a slave logic block 652 which drives the output enable of the SDIO driver 642B on read or condition indication operations. The retimer element 302B includes an input output block 654 which uses the SCLK signal to clock in the values on the SDIO line to obtain the input values on write operations and drives the SDIO value to the SDIO driver 642B on read or condition indication operations. The timing of the SDIO reads or condition indication is based on the SCLK signal.

Figure 9:
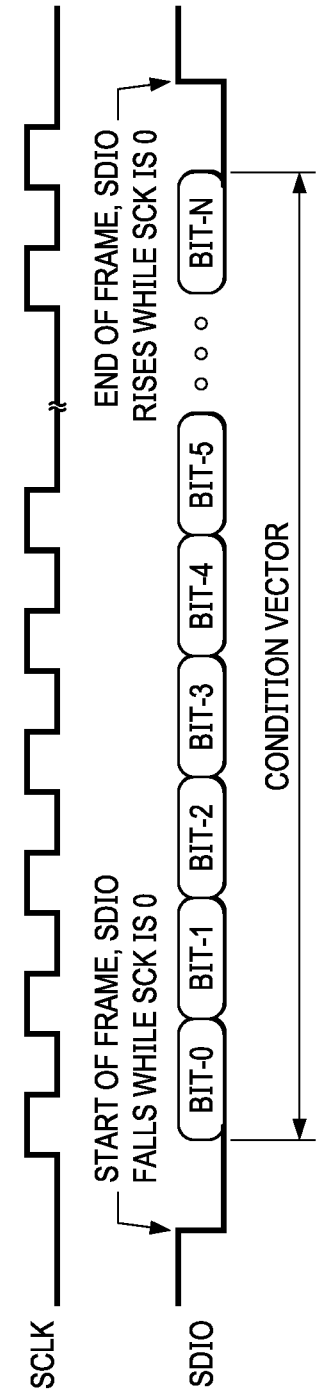
FIG. 9 is a timing diagram of the SCLK and SDIO communication signals of FIG. 6.

FIG. 9 illustrates operation of the serial bus 504. The master, such as the retimer element 302A, drives the SCLK signal as illustrated, providing a regular clocking pattern. In the illustrated frame, the SDIO signal is driven by the master as this is the provision of a condition vector or command, such as a state indication for the various state machines. The master logic block 648 provides the particular bit of the serial information based on the rising edge of the SCLK signal. The retimer element acting as a slave reads the value on the SDIO line on the rising the next rising edge of the SCLK signal. This continues in the desired manner until the necessary number of bits have been transmitted. If a read operation is desired, after the number of command bits that indicate the read operation and address and a turnaround time, the slave retimer element begins driving data values onto the SDIO line. If internal conditions of a retimer element need to be indicated, as described below, the retimer element drives the SDIO line low during the proper bit time. The wired-OR nature of the SDIO line allows the retimer elements to indicate internal conditions as appropriate without requiring read operations.

The actual values provided in the condition vector or command are a design choice as needed for the particular application. In some cases the condition vector can be relatively short if only given a limited number of states are necessary to operate the particular devices of interest, whereas in other situations longer values may be needed and provided. In certain other cases some of the bits are used for the encoded condition vector and other bits are used as condition status bit positions to allow any retimer element to drive the SDIO line low during the appropriate bit time to indicate the presence of the specific condition, with that bit being high indicating that the condition has ended or been met.

Figure 10:
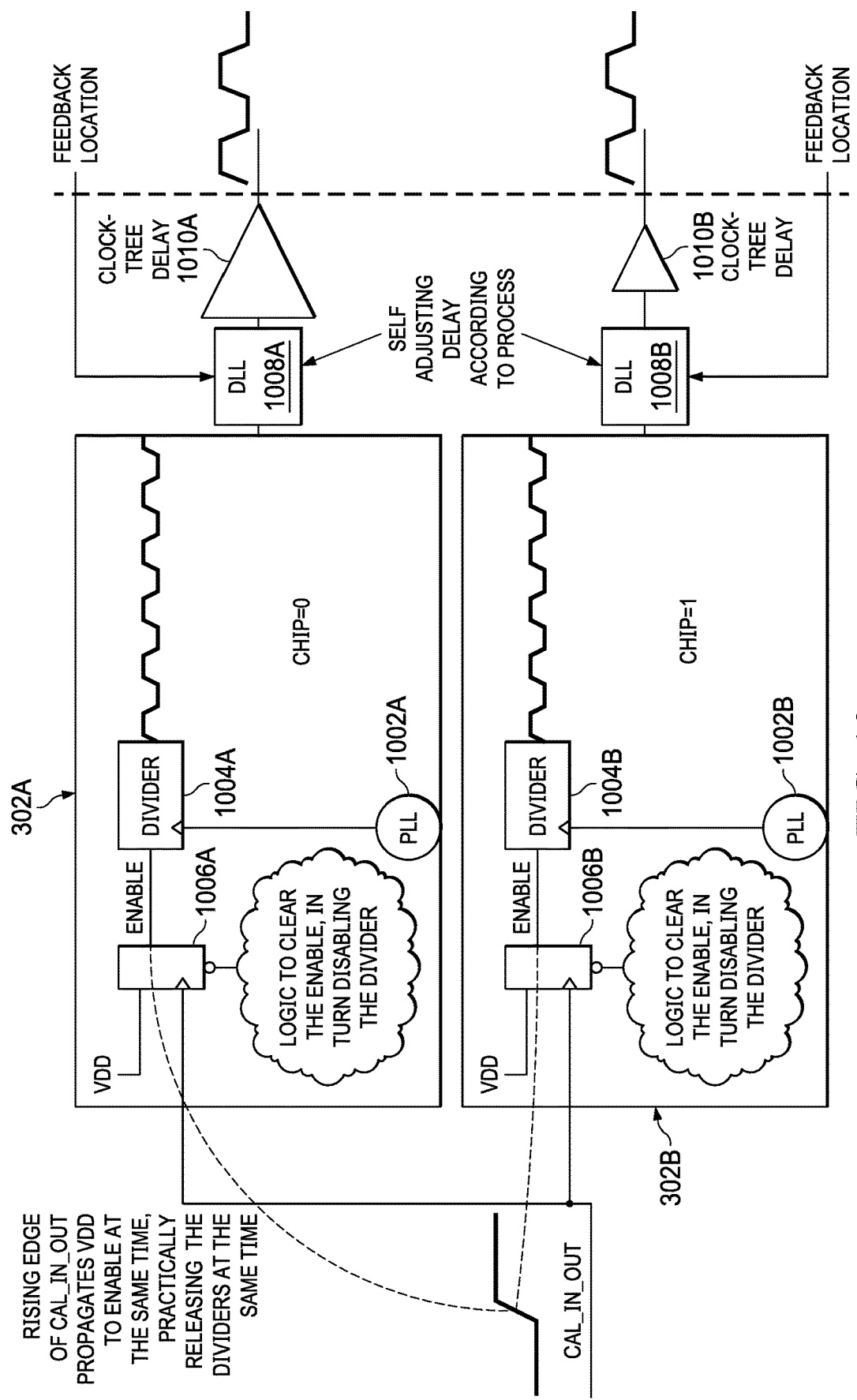
FIG. 10 is a block diagram of clocking circuitry using the CAL_IN_OUT communication signal of FIG. 6.
Figure 11:
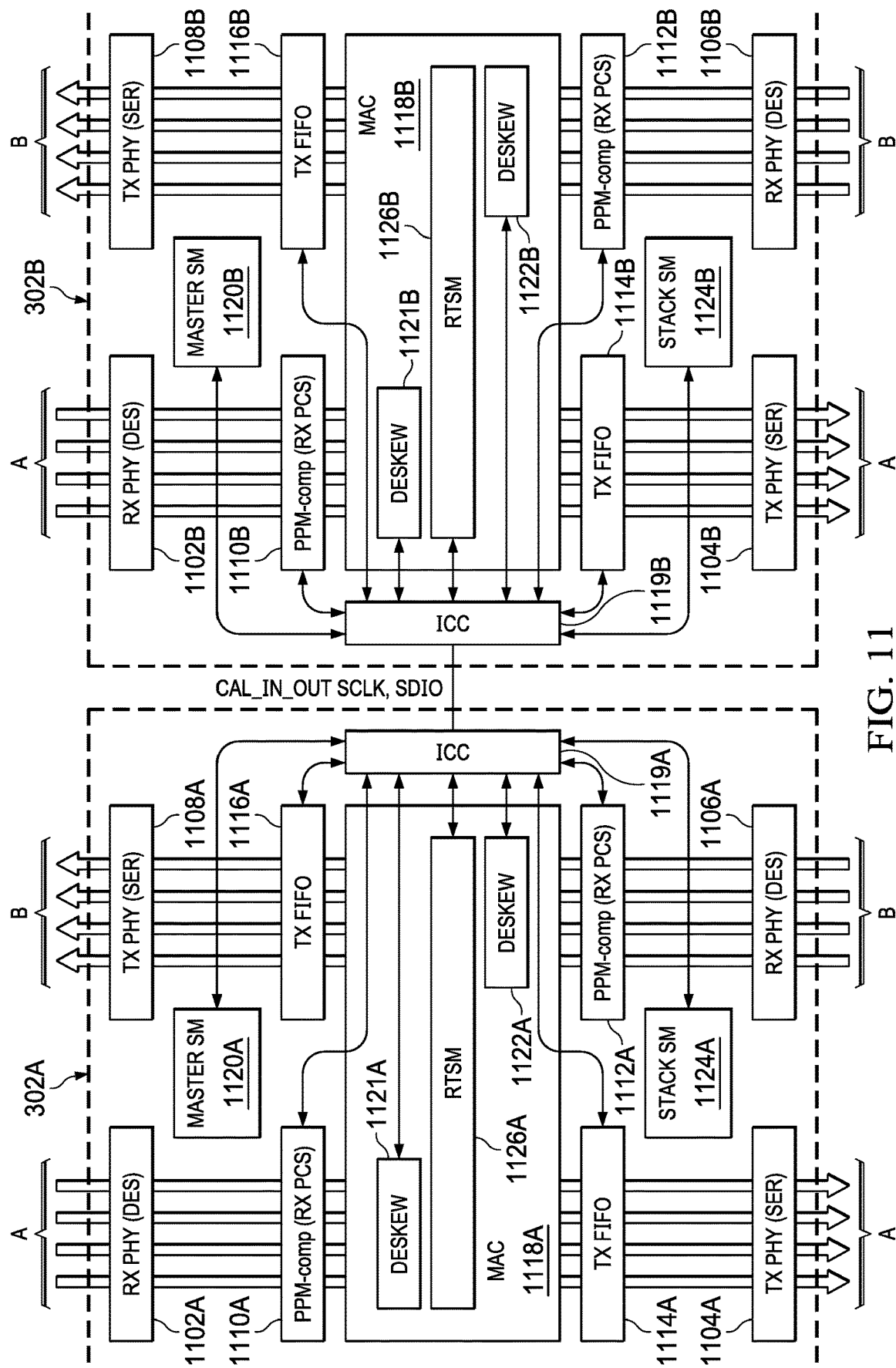
FIG. 11 is a block diagram of two retimer elements and various state machines used to control the retimer elements.

One example of the use of the CAL_IN_OUT signal is the synchronization of the clocks used in the various devices. In FIG. 10 the clock driver logic of two different retimer elements 302A, 302B is illustrated. Each retimer element 302A, 302B includes a phase locked loop 1002A, 1002B which is based on the input CLK signal and divided as appropriate to produce the desired internal clock signal. The PLL output is provided as the clock to a divider 1004A, 1004B, which provides the internal clocking signal. Divider 1004A, 1004B has an enable input provided by a flip-flop 1006A, 1006B. The flip-flop 1006A, 1006B is cleared so that the divider is not enabled when clock is not being provided internally. The D input of the flip-flop 1006A, 1006B is tied high. The clocking input is provided by the CAL_IN_OUT signal. In this manner, when the CAL_IN_OUT signal has a rising edge, the enables to the two dividers 1004A, 1004B are set to one at the same time. This allows the clocks to be synchronized from the dividers 1004A, 1004B in the retimer elements 302A, 302B. However, this is not sufficient as each retimer element 302A, 302B will be slightly different based on temperature, process parameters of the integrated circuit and the like. Therefore the output of the divider 1004A, 1004B is sent to the input to a delay locked loop (DLL) 1008A, 1008B, as a reference clock. The delay locked loop 1008A, 1008B is used to provide phase correlation to compensate for the various delays in the particular clock trees of the individual components. Each delay locked loop 1008A, 1008B receives a feedback location clocking signal from the desired clock location to be synchronized and phase locked to the reference clock. Based on the feedback location clocking signal, the delay locked loop 1008A, 1008B synchronizes the phase of the clock signal so that the feedback location clocks are in synchronization with respect to the reference clock. The output of the DLL 1008A, 1008B goes through a clock delay tree 1010A, 1010B, based on conventional clock driver trees, to provide the desired clock which will be correct when received at the feedback location. The clocking signal at the feedback locations will be in-phase with that from the divider 1004A, 1004B Referring now to FIG. 11, simplified block diagrams of two exemplary retimer elements 302A, 302B is provided. Illustrated are the various blocks of a retimer element with relation to particular state machines that are used control operation of portions of those blocks. Each retimer element 302A, 302B includes the various necessary PHYs, such as A side receive PHY 1102A, 1102B, an A side transmitter PHY 1104A, 1104B, a B side receive PHY 1106A, 1106B and a B side transmitter PHY 1108A, 1108B. Retimer element 302A, 302B includes a parts per million (PPM) compensation block 1110A, 1110B, 1112A, 1112B on the receiver for the A and B sides. A transmit FIFO 1114A, 1114B is provided on the A side output while a transmit FIFO 1116A, 1116B is provided on the B side transmitter. A MAC block 1118A, 1118B is provided in each retimer element 302A, 302B to perform the necessary functions of a MAC element. An ICC block 1119A, 1119B interconnect the retimer elements 302A, 302B.

Various state machines interact with these particular blocks. A master state machine 1120A, 1120B provides initial control up to starting the clocks on the retimer elements 302A, 302B. A de-skew state machine 1121A and 1121B is provided on the A side receiver, while a de-skew state machine 1122A, 1122B is provided on the B side receiver. The de-skew state machines 1121A, 12121B, 1122A, 1122B are used to make sure that the skewing for the particular direction is synchronized between the retimer elements. A stacking state machine 1124A, 1124B is used to further guarantee that the various retimer elements are synchronized. A PPM compensation logic is used to insure that the buffers do not underrun or overrun. A retimer state machine (RTSM) 1126A, 1126B is used to manage equalization of the lanes and to control shutdown of the lanes. The various state machines and PPM logic are described in more detail below. In the descriptions of the state machines, the A, B, C or D suffix has been removed to describe the state machines more generally, not tied to a specific retimer element.

Figure 12:
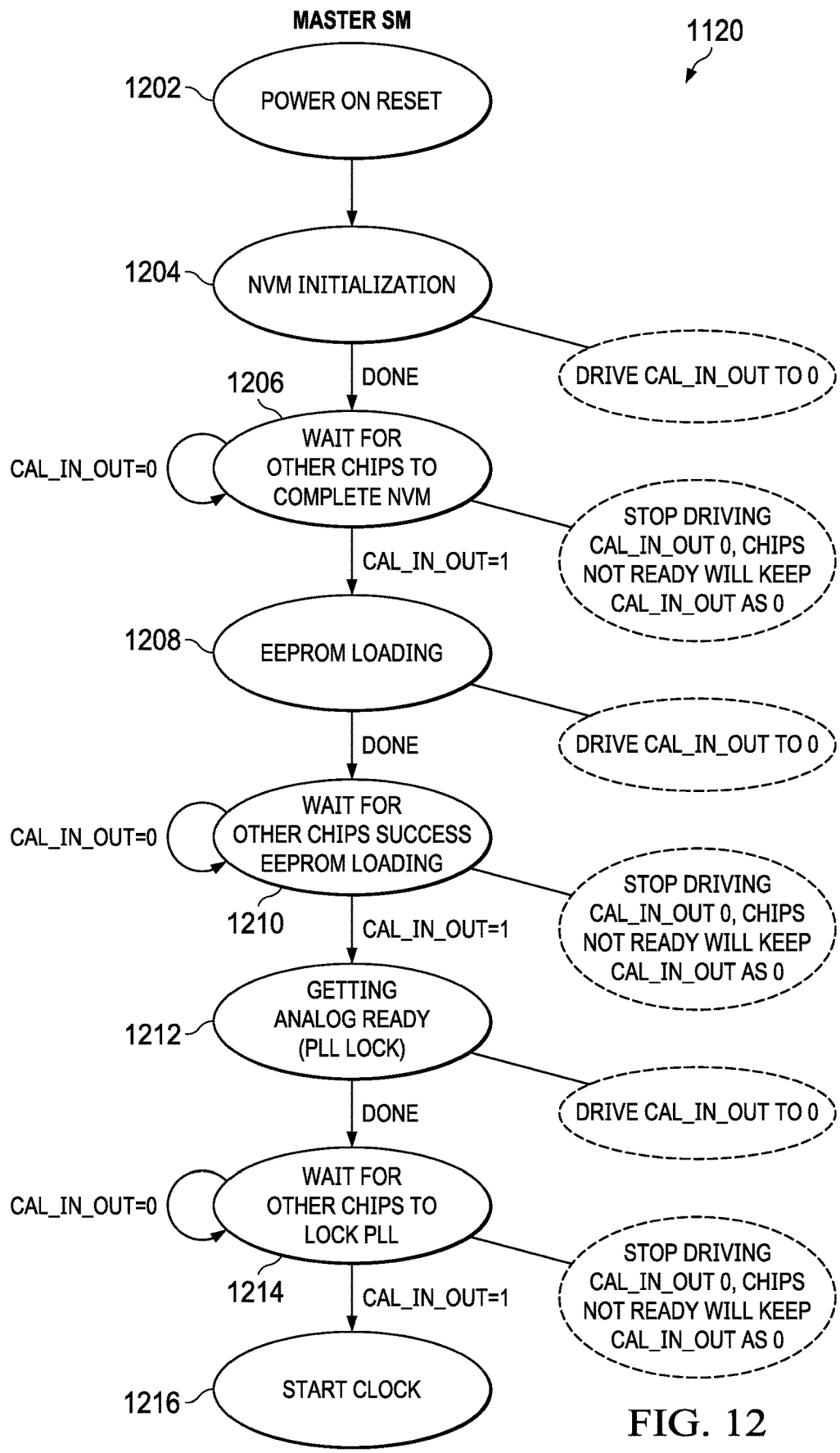
FIG. 12 is a master state machine used in the retimer elements.

The master state machine 1120 is illustrated in FIG. 12. Initial state 1202 is the power on reset state. Once power on reset is been completed, the next state is the NVM (non-volatile memory) initialization state 1204. In state 1204 the retimer element drives the CAL_IN_OUT signal low. When NVM initialization is completed the master state machine 1120 proceeds to state 1206. In state 1206 the retimer element stops driving the CAL_IN_OUT line and the master state machine 1120A waits for the CAL_IN_OUT signal to not be zero, indicating that all of the other retimer elements have completed nonvolatile memory initialization. When the CAL_IN_OUT line goes high, indicating all of the retimer elements have completed NVM initialization, the next state is the EEPROM loading state 1208. In state 1208 the retimer element drives the CAL_IN_OUT signal low. When EEPROM loading is completed operation proceeds to state 1210 where the retimer element stops driving the CAL_IN_OUT signal and waits for the CAL_IN_OUT line to be high, indicating all of the other retimer elements of also completed EEPROM loading. When all of the retimer elements have completed EEPROM loading, the phase locked loop (PLL) is started in state 1212 and the retimer element drives the CAL_IN_OUT signal to zero to indicate operation in progress. When the PLL is locked, control proceeds to state 1214, where the retimer element stops driving the CAL_IN_OUT line and waits until the CAL_IN_OUT signal is equal to one, indicating all of the retimer elements have completed the starting the PLL. When all of the retimer elements have completed PLL start, operation proceeds to state 1216, where the internal clock is started in the retimer element. This is the completion of the master state machine 1120 for purposes of this description. In practice the master state machine 1120 does other items relevant to restarting up the retimer element but those operations have been omitted for simplicity.

Figure 13:
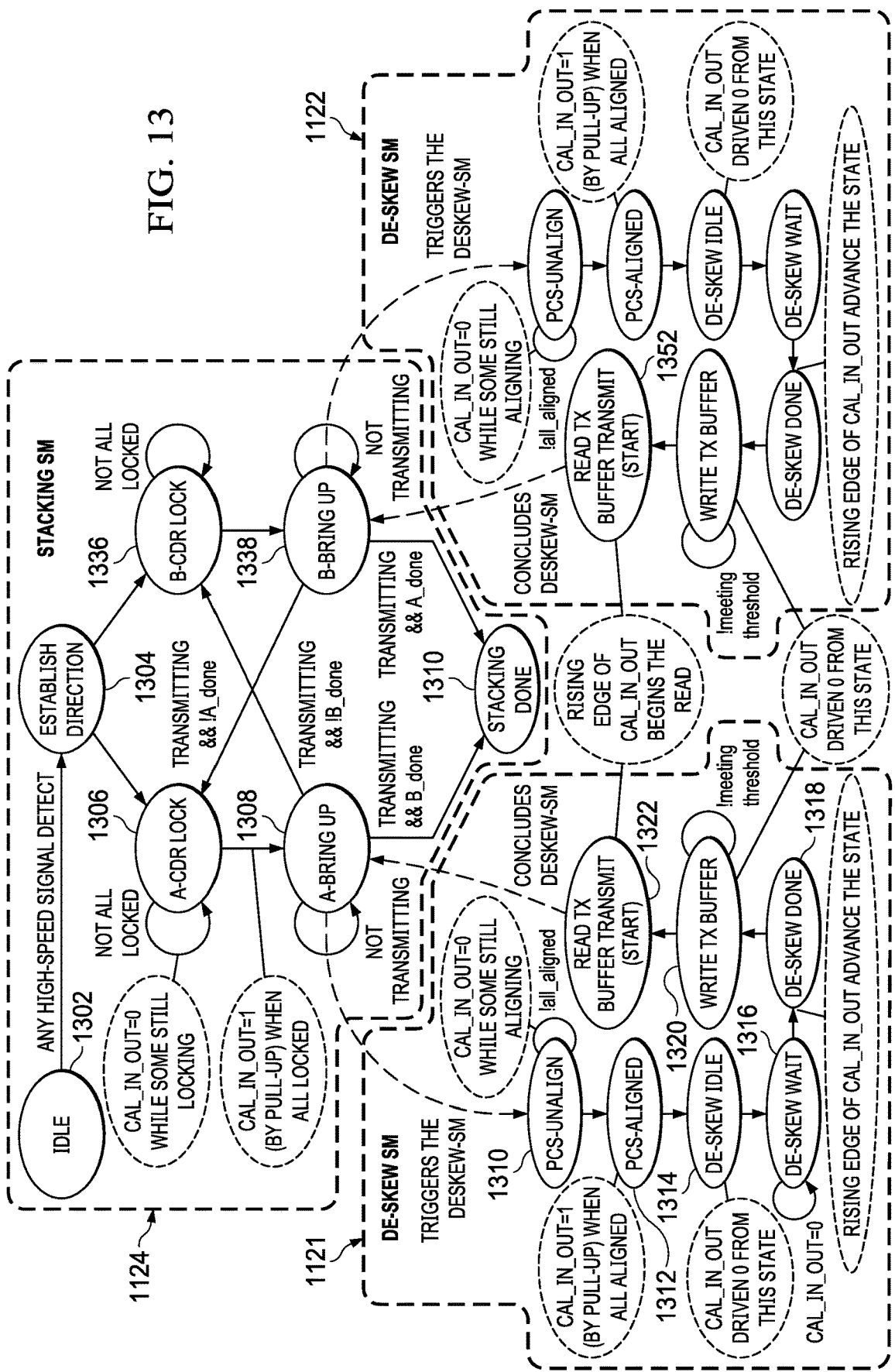
FIG. 13 is a de-skew state machine used in the retimer elements.

FIG. 13 illustrates the operation of the stacking state machine 1124 in combination with the de-skew state machine 1121 and de-skew state machine 1122. Operation begins at state 1302 where the stacking state machine 1124 is waiting to receive a high-speed signal. As soon as a high-speed signal is received operation proceeds to state 1304 to which side, the A side or the B side, to initialize first. One case operation proceeds to the A side clock and data recovery (CDR) lock state 1306. In the A side CDR lock state 1306 the retimer element is waiting for the A side receive PLL's for each of the PCIe lanes to synchronize and lock. While the lane PLLs are not locked, the retimer element drives the CAL_IN_OUT signal low. When all of the retimer elements have locked all of the PLLs on their lanes, operation proceeds to state 1308. Entering state 1308 triggers the commencement of the de-skew state machine 1121. The de-skew state machine 1121 commences at state 1310, where the alignment of the physical coding sub-layer (PCS) is commenced. The retimer element drives the CAL_IN_OUT signal low to indicate the PCS is not aligned, as do all of the other retimer elements. When the PCS is aligned the retimer element stops driving the CAL_IN_OUT signal low and when all of the retimer elements are in alignment, operation proceeds to state 1312.

After state 1312 operation proceeds to state 1314, where de-skewing is commenced. In state 1314 the retimer element drives the CAL_IN_OUT signal low. Operation proceeds to state 1316 where the de-skew state machine 1121A waits until the retimer element has de-skewed and driven the CAL_IN_OUT signal high and all of the remaining retimer elements similarly have stopped driving the CAL_IN_OUT signal, thus indicating that the retimer elements have all de-skewed. Operation proceeds to state 1318 to indicate that the de-skewing is done. Operation proceeds to state 1320 where the transmit buffer is loaded. When sufficient data is in the transmit buffer, operation proceeds to state 1322 for transmission. At this state, the master device issues a rising edge on the CAL_IN_OUT line, to start the clock to read the TX-buffer across all chips. The clock start is described above with reference to FIG. 10. Entering state 1322 provides an indication to state machine 1124A state 1308 that transmission has started. If the B side has completed the de-skewing operation and the A side is now transmitting, operation proceeds from state 1308 to state 1310, where stacking is indicated as done.

If the B side has not started the de-skewing operation at state 1308, operation proceeds to step 1336 waiting for the B side CDR lock. When all of the B sides are CDR locked, as indicated by the CAL_IN_OUT signal being high, operation proceeds to state 1338 to wait for transmission by the B side. Entering state 1338 triggers the de-skew state machine 1122, which operates similarly to the de-skew state machine 1121. Ultimately in state 1352 when transmission is started on the B side transmitter, an indication is provided to state 1338 that the B side is transmitting. If the A side has completed and the B side is now transmitting, operation proceeds to state 1310. If the A side has not started the de-skewing, operation returns to state 1306.

Figure 14:
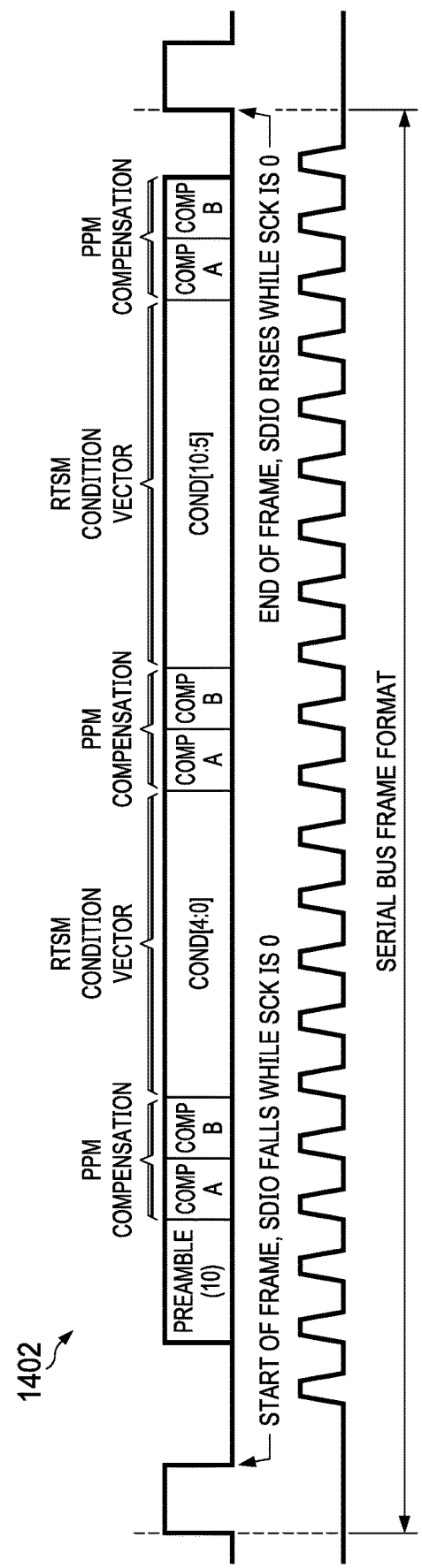
FIG. 14 is a serial bus frame.

FIG. 14 illustrates a frame 1402 on the serial bus 504. The start of frame is indicated by the SDIO signal going low while the SCLK signal is low. A two bit preamble starts the actual frame 1402. The first instance of two PPM or parts per million compensation data bits are provided next. As well known, PPM compensation must be done to prevent buffer underflow or overrun. The PPM compensation data bits indicate which direction, A or B, needs compensation or operation correction and whether a SKP symbol should be inserted or removed in a SKP ordered set. A first portion of a RTSM condition vector are the next five bits, followed by a second occurrence of two PPM compensation data bits. The remaining six bits of the RTSM condition vector follow.

The frame data ends with a third set of two PPM compensation data bits. In certain cases the condition vector has two portions, one portion where state machine indications are encoded by the master retimer element and a second portion where individual condition bits represent internal conditions of the retimer elements. As the SDIO line is a wired-OR connection, any retimer element having the specific indicated condition can drive the related condition vector bit low. The retimer elements monitor these individual bits to determine if a state machine transition should be done. This operation is described below. The end of frame is signaled by the SDIO signal rising while the SCLK signal is low. The illustrated frame 1402 is immediately followed by another frame, as the SCLK and SDIO signals are constantly running during operation.

PPM compensation information is transmitted over the serial bus 504 as each lane must lengthen or shorten SKP ordered sets together. Using the serial bus 504 allows this to happen efficiently. The actual SKP ordered set addition or dropping is performed when the next SKP ordered set is received at the given lane. The PCIe specifications require that a SKP ordered set be transmitted periodically to allow this PPM compensation by downstream elements. By sending the PPM compensation bits three times in each frame, a PPM compensation value is present each time an SKP ordered set is received, based on the speed of the SCLK signal and the conventional SKP ordered set issuance rate.

Figure 15:
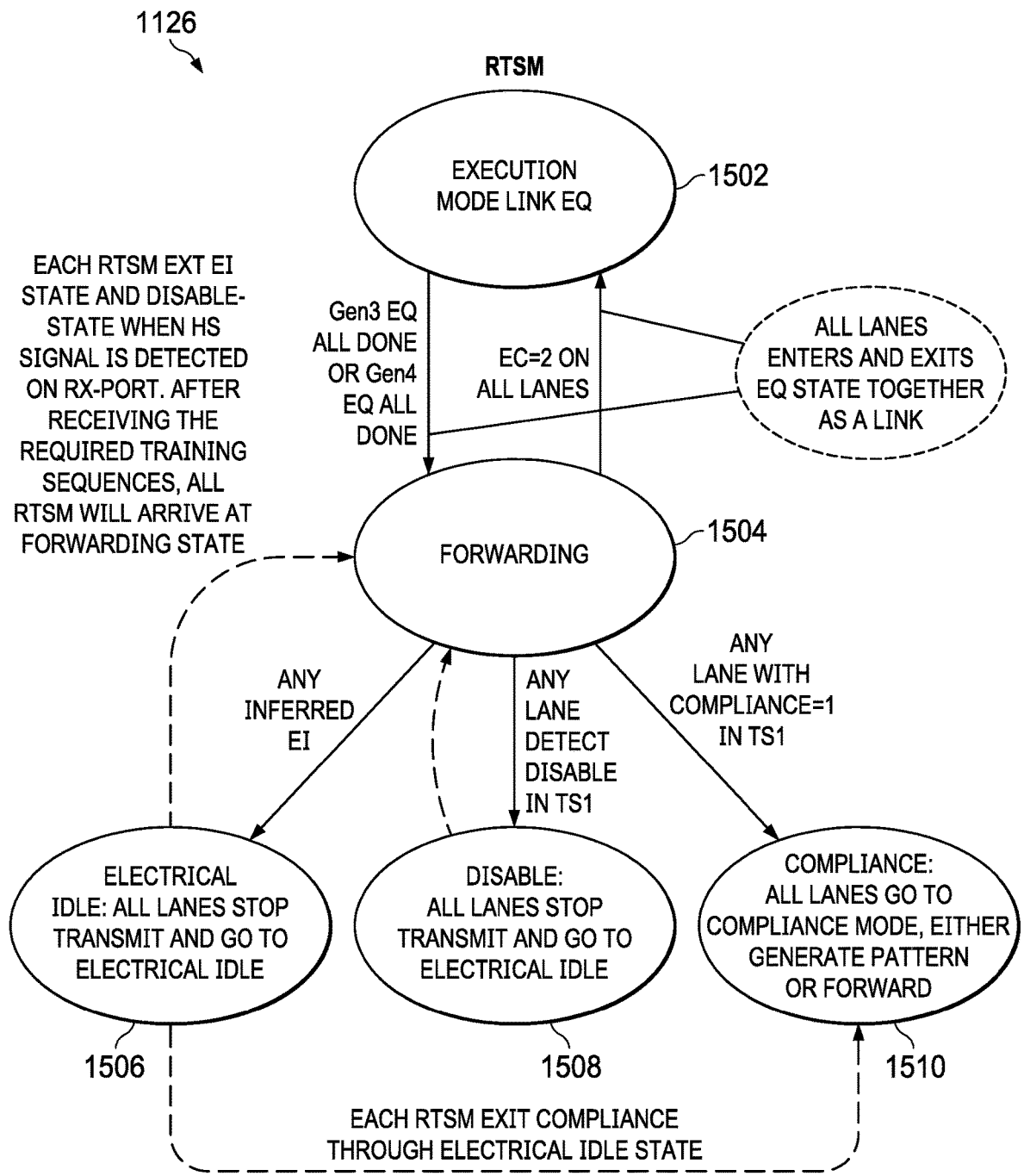
FIG. 15 is an RTSM state machine used in the retimer elements.

FIG. 15 illustrates the RTSM or retimer state machine 1126. Once the de-skewing is done on both directions A and B, the RTSM 1126 begins at state 1504, where each retimer element is forwarding the data in both directions. The signal CAL_IN_OUT is not used, and the state machine synchronization relies on the serial bus 504. Each retimer element actively checks the ordered sets being received, with each retimer element updating or driving a corresponding bit in the condition vector as discussed above. When all of the lanes in one of the retimer elements receive EC=2, which is a field in the training sequence ordered set, the retimer element stops driving the SDIO line for the corresponding bit in the condition vector. Because it is opening-drain signaling, the bit is '1' if the lanes in all other retimer elements also see EC=2, causing the RTSM 1126 on every retimer element to transition to a Link EQ state 1502. Otherwise, the bit remains driven to '0'. In other words, all of the retimer elements contribute to the condition vector bit, so that the RTSM 1126 of all the retimer elements respond to the combined result on the condition vector. The RTSM 1126 stays at the Link EQ state 1502 until all the lanes on every retimer element have completed the EQ operation, as indicated by another bit in the condition vector through open-drain signaling as described above. This all-complete condition is carried by the serial bus frame condition vector bit, so that the RTSM 1126 of all retimer elements goes back to forwarding state 1504.

From the forwarding state 1504, it is also possible that one of the lanes in any one of the retimer elements suddenly loses the high-speed signal. This event is commonly referred to as inferred electrical idle. If such an event occurs to any one of the lanes in any of the retimer elements, the retimer element provides this event in the condition vector by driving the corresponding bit to '0', instead of not driving it. In other words, if all the lanes are receiving high-speed signals, no retimer element is going to drive the electrical idle bit to '0', and the bit in the condition vector remains '1'. When the condition vector shows a '0' on the corresponding bit, the RTSM 1126 in all of the retimer elements know that at least one lane in the link has lost the high speed signal, so that the RTSMs 1126 all go to electrical idle state 1506, where the transmitters are gracefully shut off for both directions.

A less dramatic condition to shut off the lanes is through the disable-bit in the training sequence TS1. When the RTSM 1126 is in state 1504 and any one of the lanes detects the disable command from TS1, the retimer element will indicate this change by driving the corresponding bit in the condition vector to '0'. Because it is open-drain signaling, the corresponding bit in the condition vector is '0' as long as one of the retimer elements drives it to '0'. All the RTSM 1126 see the condition vector has changed and transition to state 1508, where the transmitters are gracefully shut off. From state 1506 or state 1508, the RTSM 1126 of each retimer element exits the state when a high speed signal is detected again, which triggers the stacking state machine 1124 and the de-skewing state machines 1121, 1122. The RTSM 1126 eventually goes back to forwarding state 1504 after the stacking state machine 1124 and the de-skew state machines 1121, 1122 complete.

The next option from the forwarding state 1504 is to proceed to compliance state 1510, which is triggered similarly to disable state 1508 except that the compliance bit is set in TS1. All the lanes in the retimer elements enter a compliance mode and either generate or forward the required pattern. After completion of compliance mode operation, the RTSM 1126 proceeds from compliance state 1510 to electrical idle state 1506.

As discussed above, the CAL_IN_OUT or calibration line is used to synchronize operations between the retimer elements so that the retimer elements transition states in unison. The serial bus is used to provide next state information when the next transition could be to one of several different states. The serial bus is also used to provide data needed across all of the retimer elements for consistent operation. The serial bus is also used to return status information from the retimer elements to all of the retimer elements so that all of the retimer elements can proceed together even though only one retimer element may have the triggering condition. The use of the calibration line and serial bus allows a monolithic retimer to be split into slices or elements and yet have all of the various state machines and other parameters maintain needed synchronization so that the combination of the elements functions like the monolithic retimer.

It is understood that only example state machines, states and data have been discussed above to provide an explanation. Many more state machines, states and data may be used in a practical retimer design, but the needed synchronization and the like can be performed using the techniques and items discussed herein.

While each retimer element has been shown as being the same width, if desired different elements can be different widths.

It is further understood that a retimer is just one example of a processing device that uses state machines to control operations and that can be split into processing slices or processing elements and have the combination perform the same as the wider unitary device. Related examples are the transmitter and receiver PHY and MAC modules used at the ends of a PCIe link and in PCIe switches. It is further understood that operation is not limited to PCIe but other serial link formats, such as InfiniBand and the like. It is even further understood that operation is not limited to serial devices but can be applied to many devices where multiple widths can be used and the various items must be synchronized in operation.

The above description is intended to be illustrative, and not restrictive. For example, the above-described examples may be used in combination with each other. Many other examples will be upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A processing device comprising:
 a processing element containing a plurality of state machines which control operation of the processing element;
 a calibration input/output for connection to a wired-OR calibration line; and
 a serial bus endpoint for connection to a serial bus, the serial bus including a serial bus clock and a serial data line for providing state data,
 wherein the calibration input/output receives indications from and provides indications to the plurality of state machines and the serial bus endpoint provides indications to the plurality of state machines,
 wherein at least some of the plurality of state machines provide indication to the calibration input/output that the state machine is operating in a specific state, and
 wherein at least one of the plurality of state machines transition based on indications from the calibration input/output and at least one of the plurality of state machines transition based on state data provided on the serial bus.

2. The processing device of claim 1, wherein the processing element is a master element and wherein the serial bus endpoint provides the serial bus clock and the state data on the serial data line.

3. The processing device of claim 1, wherein the processing element is a slave element and wherein the serial bus endpoint receives the serial bus clock and the state data on the serial data line.

4. The processing device of claim 1, wherein the processing device is a link retimer.

5. The processing device of claim 4, wherein the serial data line further provides condition data, and
 wherein the processing element uses the condition data to perform an operation.

6. The processing device of claim 1, wherein the serial data line further provides operation correction data and wherein the processing element uses the operation correction data to correct an operation.

7. The processing device of claim 1, wherein the processing element includes a clock driver providing a clocking signal and wherein the calibration input/output synchronizes the clocking signal provided by the clock driver.

8. A method of operating a processing device, the processing device including a processing element containing a plurality of state machines which control operation of the processing element, the processing element including a calibration input/output for connection to a wired-OR calibration line; and a serial bus endpoint for connection to a serial bus, the serial bus including a serial bus clock and a serial data line for providing state data, the method comprising:
 the calibration input/output receiving indications from and providing indications to the plurality of state machines;
 the serial bus endpoint providing indications to the plurality of state machines;
 at least one of the plurality of state machines providing indication to the calibration input/output that the state machine is operating in a specific state;
 at least one of the plurality of state machines transitioning based on indications from the calibration input/output; and
 at least one of the plurality of state machines transitioning based on state data provided on the serial bus.

9. The method of claim 8, wherein the processing element is a master element and wherein the serial bus endpoint provides the serial bus clock and the state data on the serial data line.

10. The method of claim 8, wherein the processing element is a slave element and wherein the serial bus endpoint receives the serial bus clock and the state data on the serial data line.

11. The method of claim 8, wherein the processing device is a link retimer.

12. The method of claim 11, wherein the serial data line further provides condition data, and
 wherein the processing element uses the condition data to perform an operation.

13. The method of claim 8, wherein the serial data line further provides operation correction data and wherein the processing element uses the operation correction data to correct an operation.

14. The method of claim 8, wherein the processing element includes a clock driver providing a clocking signal and wherein the calibration input/output synchronizes the clocking signal provided by the clock driver.

* * * * *